United States Patent Office 3,271,346
Patented Sept. 6, 1966

3,271,346
PROCESS FOR PRODUCING ELASTIC
POLYURETHANE YARN
Ryoichi Wakasa, Tokyo, Atsushi Shibata, Urawa-shi, and
Jukichi Ohmura and Isamu Suzuki, Tokyo, Japan,
assignors to Asahi Kasei Kogyo Kabushiki Kaisha,
Osaka, Japan, a corporation of Japan
No Drawing. Filed July 5, 1963, Ser. No. 293,184
Claims priority, application Japan, July 7, 1962,
37/28,465
8 Claims. (Cl. 260—30.8)

This invention relates to a process for producing polyurethane elastic fiber. More specifically, this invention relates to a process for producing new polyurethane elastic yarn, with economic advantage, of which mechanical properties such as elongation and elastic recovery are excellent and initial modulus is small.

According to the present invention, elastic yarn can be produced at a low cost and with outstanding properties, some of which are given as follows: The yarn is satisfactorily elongated when being drawn with a small force, and elongations up to the breaking of the yarn are large. The tensile strength before breaking is large, and permanent set after loading is scarcely produced. Moreover during the time when the yarn is held in a stretched state for a long time, the force required for maintaining such state is unvarying.

This invention provides a process for producing elastic yarn which comprises reacting diol polymer having end hydroxy groups such as polyether, polylactone, poly(oxyalkylene-carboxyalkylene), and the like with an organic diisocyanate in the presence of water in a definite amount and preferably adding a surface active agent to synthesize prepolymer having NCO group as the end groups (macrodiisocyanate), dissolving the prepolymer into an adequate solvent, then adding water thereto at room temperature to form a perfect gelation state and thereafter heating the resulting gel to a temperature between 120° C. and 180° C. to return it to a solution state.

The present inventors have found that when a prepolymer having terminal isocyanate groups is dissolved in dimethyl formamide or dimethylacetamide and is subjected to chain-extending reaction with water, the reaction system is frequently so perfectly gelated that spinning becomes impossible. After extensive study of the reaction of a prepolymer with water, they have also found that the gelated reaction system can form a viscous solution by heating the system at a suitable temperature and the yarn obtained by spinning said viscous solution is superior in elasticity. Further, they have found in the synthesis of a prepolymer that if a suitable amount of water is added to a diol in advance and the reaction with a diisocyanate is carried out with a catalyst or under relatively severe conditions, a stronger gel is obtained than in the case where the prepolymer is dissolved in a solvent and chain extension is carried out with water, and the yarn produced by spinning a viscous solution obtained by heating the said gel, is much superior in elasticity. Based on these findings, the method of the present invention has been developed. The use of water as a chain extender in the production of a polyurethane electric yarn is already known. An attempt to carry out chain-extending reaction by dissolving a prepolymer in dimethyl formamide or dimethyl acetamide and adding water thereto at a temperature of about 100° is also known, but in addition to the reaction between water and the terminal isocyanate radicals of the prepolymer, a side reaction between the isocyanate radical and the solvent takes place in parallel and adversely affects the properties of the produced yarn. In accordance with the present invention, the side reaction between the isocyanate radical and the solvent is avoided because the reaction is carried out at room temperature and the gel formed is heated into a viscous solution, by which the above-mentioned disadvantage can be avoided.

Some advantages of the invention are illustrated as follows. First, expensive reagents such as hydrazine or organic diamine which have been used heretofore as prior cross-linking agent of the prepolymer, is unnecessary. Second, the yarn is able to be spun by using a comparatively cheap coagulating agent such as air, water, aqueous ammonia, aqueous solution of inorganic salts, glycerine, various kinds of alcohols, and the like without using hydrazine or organic diamine, because formation of fiber by using a wet or dry spinning method becomes possible, unlike prior chemical spinning processes. Third, the solution obtained by heating the gelated material is extremely stable at room temperature; accordingly, the viscosity of the solution is always held constant even after standing in air for long periods, so that the spinning procedure is extremely facilitated. Fourth, since the solvent to be used such as dimethylformamide, dimethylacetamide, dimethylsulfoxide, etc. is not required to be in absolutely anhydrous state, recovery of the solvent from the spinning bath can be cheaply carried out. This is a very great advantage.

As the diol polymer used in the present invention; polyester, polyether, polylactone, poly(oxyalkylene-carboxyalkylene), and the like, have been noted.

More particularly, the polyester is a polymer having end hydroxy groups obtained by the condensation reaction of one member selected from the group consisting of dicarboxylic acids such as succinic acid, adipic acid, suberic acid, sebasic acid, hexahydroterephthalic acid, dimer acid, and the ester and the acid chloride thereof with one member selected from the group consisting of glycols such as ethylene glycol, propylene glycol, butylene glycol, decamethylene glycol, 2,2'-dimethyl-1,3-propanediol, cyclohexane diol, etc.

As the polyether there can be employed polyethylene oxide, polypropylene oxide, polytetramethylene oxide, polypentamethylene oxide, polyhexamethylene oxide, polyoctamethylene oxide, or poly(ethylene oxide·propylene oxide).

As the poly(oxyalkylene·carboxyalkylene) there can be employed
poly-(dimethyl-$\epsilon$-caprolactone·ethylene glycol),
poly($\beta$-methyl-$\epsilon$-caprolactone·tetramethylene glycol),
poly($\epsilon$-caprolactone·ethylene glycol),
poly($\epsilon$-caprolactone·propylene glycol),
poly($\delta$-valerolactone·ethylene glycol) or
poly($\delta$-valerolactone·propylene glycol).

Poly($\delta$-valerolactone), poly($\epsilon$-caprolactone), poly($\alpha$-methyl - caprolactone), poly($\beta,\gamma,\delta$ - trimethyl-$\epsilon$-caprolactone), etc. are cited as examples of the polylactones.

As the diol polymer; polymers having a molecular weight between 400 and 10,000 are employed, and solid or liquid polymers having a melting point less than 80° C. and a molecular weight ranging from 700 to 3,000 are preferable.

As the organic diisocyanate to be added to above-said diol polymer there are employed diisocyanate such as 1,3-phenylene diisocyanate, 1,4-phenylene diisocyanate, 2,4-tolylene diisocyanate, 2,5-tolylene diisocyanate, 1,4-naphthalene diisocyanate, 1,5-naphthalene diisocyanate, 2,6-naphthalene diisocyanate, 4,4'-biphenyl diisocyanate, 3,3'-dimethyl-4,4'-biphenyl diisocyanate, 4,4'-diphenylmethane-diisocyanate, 2,2'-dimethyl-4,4'-diphenylmethane diisocyanate, etc.

In the production of prepolymer, the organic diisocyanate in an excess amount or preferably in an amount ranging from 150 to 300 mole percent based on the diol polymer is heated with the diol polymer optionally in the presence of a polymerization catalyst and in the absence of a solvent. The catalyst is not necessarily required in the procedure, but the presence of some amount of catalyst is preferable for improving the properties of the elastic yarn produced by the procedure as will be described hereinafter.

As the polymerization catalyst there may be employed tertiary amines such as dimethylcylohexyl amine, triethylamine, triethylene diamine or heavy metal compounds soluble in the reaction system such as iron-acetoacetate, dibutyltin-di-laurate, etc.

In the case of the reaction of diol-polymers with diisocyanates, addition of water in the amount ranging from 3 to 30 mole percent based on diisocyanate is satisfactory for good results.

The reaction temperature and the reaction time vary respectively depending on the kind and the molecular weight of the polymer, the kind and the amount of the diisocyanate to be used, the kind of the objective product, or the kind and the amount of the catalyst; generally, a temperature between room temperature and 160° C., and a reaction time between 5 and 300 minutes are employed.

Generally, in the case in which the molecular weight of the diol polymer is large and a catalyst is not employed, the reaction conditions should be somewhat severely employed. Inversely, if the molecular weight of the diol polymer is in the range of 700 to 2,000 and a catalyst is employed, the reaction should be carried out at a temperature between room temperature and 150° C., preferably between 50° C. and 130° C., for a time between 30 and 100 minutes.

Subsequently, the polymer obtained by the process as described hereinabove is cooled and then dissolved in a proper solvent. Dimethylformamide, dimethylacetamide, dimethylsulfoxide, etc. are considered suitable solvents. In this case, the concentration of the solution is required to be suitable for spinning and accordingly, it is preferably in a range of 15% to 50% by weight, generally from 20% to 30% by weight. When an adequate amount of water dissolved in each solvent is added dropwise into each solvent while the solution is held at room temperature, the polymerization reaction proceeds with the evolution of carbon dioxide. When the addition amount of water reaches a definite value, the reaction system finally reaches a gel state which is impossible to stir. The amount of water required up to gelation varies considerably depending on the history of the prepolymer, for example, the kind and molecular weight of the diol polymer used, the amount of water used in the production of prepolymer, the presence or absence of catalyst, the kind and the amount of the catalyst and the reaction conditions.

More particularly, poly ε-caprolactone diol is mixed with 4,4'-diphenylmethanediisocyanate in a molar ratio of 1:2 and water in an amount of 3 mole percent based on the diisocyanate is added thereto and allowed to react at 130° C. for one hour. The resulting product is cooled at 20° C. and dimethylformamide is added thereto, and water is added to the reaction system in an amount of 50 mole percent based on the diisocyanate. In this case, a dimethylformamide solution of the prepolymer prepared from a diol polymer having a molecular weight of 1050 to 1360 can be perfectly gelated in 70 to 80 min. upon adding water. When a diol polymer having a molecular weight of 2470 to 3670 is used, it takes about 200 min. for gelation. Further, when a diol polymer having a molecular weight of 4810 is used, it is only possible to make the solution viscous but impossible to cause gelation even after a long period of time.

In case triethylene diamine is added as a catalyst under the same conditions as above in an amount of 2.5 mole percent based on diisocyanate, the prepolymer having a molecular weight of 2470 is gelated within 60 minutes, and the prepolymer having a molecular weight of 1360 is gelated within 8 minutes.

1 mole of diol polymer having end hydroxy groups and a molecular weight of 1360 and having a composition of ε-caprolactone and propylene oxide of 1:1 is mixed with 2 moles of 4,4'-diphenyl methanediisocyanate, and water in an amount of 5 mole percent based on diisocyanate, and triethylene diamine in an amount of 5 mole percent based on diisocyanate are further added thereto and are heated at 130° C. for 80 minutes to produce prepolymer. If the prepolymer is dissolved in dimethylformamide, and water is added at 20° C. in various amounts thereof, gelation appears at a concentration in which the total amount of water added exists between 42 mole percent and 60 mole percent, but does not appear in a concentration other than above-said concentration range.

As illustrated in the examples of the copolymer consisting of ε-caprolactone and propylene oxide, the gelation velocity becomes small in proportion as the composition ratio of the propylene oxide in copolymer increases. Generally, the gelation velocity of polyesterdiol is larger than the velocity of polyetherdiol. The gelated product obtained can not be dissolved at 60° C., i.e., it is entirely insoluble for example in formic acid, acetic acid, cyclohexanol, methylethyl ketone, dioxane, tetrahydrofurane, etc. It is swollen in meta-cresol, phenol, cyclohexane, aniline, etc., and it is dissolved in dichloroacetate acid or mineral acid accompanied with decomposition and coloring.

According to the process of the invention, a process which comprises heating the gelated product in dimethylformamide, dimethylacetamide or dimethylsulfoxide at an outside temperature between 120° C. and 180° C. is employed. Though the reason is not so clear, the gelated product is gradually dissolved to form a final perfect homogeneous solution capable of spinning. The velocity at which the gelated product is changed to a homogeneous solution varies, of course, depending on the heating temperature, and further varies widely depending on the above-said prior procedures. Especially, the liquification velocity is retarded and moreover the viscosity of the solution is generally high in cases in which the catalyst is employed. If the resulting homogeneous solution is continued to be heated, the viscosity of the solution gradually decreases and reaches a definite value. In the process of the invention, it is recommended that the heating be stopped as soon as the gel is dissolved, and spinning is carried out at the high viscosity state. The greater the addition amount of the catalyst for increasing the viscosity of the solution the better, but too great limit exceeding a definite amount causes deterioration of the properties of the system because the heating time becomes too long; consequently uniformity of molecular weight between soluble part and insoluble part is brought about. The addition of a greater amount makes it impossible to dissolve perfectly even by heating. Neither afford a preferable result. The addition of the catalyst in an adequate amount contributes improved properties of the yarn. However, the proper amount of the catalyst is extremely difficult to determine, and the amount can not be simply defined, but can be establishd on the bases of the kind and the molecular weight of the diol polymer and the production conditions. For example, in the case of polyester or polylactone type diol polymers having molecular weights of 1,000–1,300, the catalyst in an amount of 1–5 mole percent, especially 1.5–3 mole percent based on diisocyanate is preferably employed. However if there is employed a polyester, polyether, polylactone or poly(oxyalkylene·carboxylakyline) type diol polymer having the same molecular weight of 1,000–1,300, in which the end group diol polymer consist of a copolymer composition of propylene oxide or the like and secondary alcohol, the use of larger amount of catalyst is recommended, and the use up to 30 mole percent may be possible in some case.

The details of the process of the invention will be bet-

Example 1

1 mole of poly(tetramethylene oxide)-glycol having a molecular weight of about 1200 was allowed to react with 2 moles of 4,4'-diphenyl methane diisocyanate in the presence of water added in an amount of 5 mole percent based on diisocyanate and 0.08 mole of triethylene diamine at 120° C. for one hour to yield a prepolymer. Dimethyl formamide (containing 0.12% of water) was added to the prepolymer to form a homogeneous solution at 20° C., and then water in a dimethyl formamide solution was added to the solution in such an amount that water corresponding to 50 mole percent of unchanged isocyanate groups contained in the prepolymer solution is present. The reaction proceeded while vigorously foaming and the viscosity of the solution became gradually more viscous until stirring became difficult and at last gelation was produced. This gelated product was heated in a bath at a temperature between 145° C. and 150° C., so that the gel was gradually melted to yield a homogeneous solution. This solution is poured into a large excess of methanol. The precipitated product was sufficiently washed with methanol. The melting point of the dried polymer is 270° C. accompanied with some decomposition.

Example 2

After the mixture produced by mixing 1 mole of polyester having an average molecular weight of 1130 produced by the esterification reaction of adipic acid with tetramethylene glycol, 2 moles of 4,4'-diphenyl methane diisocyanate, triethylene diamine in an amount of 5 mole percent based on diisocyanate, and water in an amount of 10 mole percent based on diisocyanate was heated at 130° C. for one hour. The resulting mixture was dissolved in dimethyl formamide. The product was reacted in the same manner as in Example 1 and was sufficiently washed with methanol. The melting point of the dried polymer is about 280° C.

Example 3

After 127 parts by weight of ε-caprolactone polymer, 53 weight parts of 4,4'-diphenyl methane diisocyanate and water in an amount of 3 mole percent based on diisocyanate were allowed to react at 150° C. for one hour, the resulting product was cooled to room temperature and dimethyl formamide was added thereto to dissolve the product. Subsequently, dimethyl formamide solution containing water in an amount of 52 mole percent based on diisocyanate groups in the dimethyl formamide solution was added to the solution, and stirring was carried out at 20° C. in a nitrogen effluent for 75 minutes until gelation proceeded to a state in which the stirring became impossible. The gel was gradually heated at a temperature between 140° C. and 145° C. to gradually form a solution. After 30 minutes a perfect homogeneous solution was obtained. The viscosity of the solution at 20° C. was 230 poises and was not changed even after being stored for 10 days thereby showing that the solution can be stably stored. This solution was extruded from a spinneret having 26 holes of dia. 0.16 mm. into aqueous ammonia at 40° C. (the depth of the fiber in the coagulation bath was 110 cm.), then was passed through a glycerine bath at 60° C. (the depth of the fiber in bath was 100 cm.), thereafter was passed through hot water at 80° C. (the depth of the fiber in bath was 200 cm.) and finally was wound at a velocity of 11.6 m./min. Subsequently, the resulting yarn was washed with water and dried in air at 80° C. The thus obtained yarn has the following properties:

Tensile strength, 0.55 g./denier; elongation, 540%, Initial modulus, 0.03 g./denier; creep recovery, 98%.

Example 4

127 weight parts of ε-caprolactone having a molecular weight of 1270 and having end hydroxy group, 52 weight parts of 4,4'-diphenyl methane diisocyanate, triethylene diamine in an amount of 1.5 mole percent based on diisocyanate, and water in an amount of 15 mole percent based on diisocyanate were mixed and then heated at 130° C. for one hour, and then the resulting product was dissolved in dimethyl formamide to produce a solution at 20° C. Water was added to the solution in such an amount that the water added to the reaction system is 48 mole percent based on diisocyanate, to thereby cause gelation rapidly within about 10 minutes. The resulting gel was heated at 150° C. to produce a homogeneous solution. The viscosity of the polymer at a concentration of 30% by weight was 480 poises. The solution was subjected to the same spinning procedure using the same spinning apparatus as in Example 3 except that the winding velocity was changed to 15.7 m./min. The yarn obtained after being dried had the following properties:

Tensile strength, 0.98 g./denier; elongation, 650%, Initial modulus, 0.05 g./denier; creep recovery, 99%.

Example 5

36 weight parts of 2,4-tolylene diisocyanate and dibutyl-tin-dilaurate in an amount of 5 mole percent based on diisocyanate were added to 136 weight parts of a copolymer consisting of ε-caprolactone and propylene oxide in a molar ratio of 1:1. Water was added to the resulting mixture in an amount to adjust the concentration of water to 3 mole percent based on diisocyanate. The resulting substance was heated at 100° C. for one hour and dissolved in dimethyl formamide to produce at a 30% solution, and water was further added thereto in an amount of 52 mole percent based on diisocayanate. Gelation was completed after about 40 minutes. The gel was heated at 150° C. for about 60 minutes to yield a homogeneous solution. The viscosity of the solution at 20° C. was 320 poises. The solution was extruded, using the same spinning apparatus as in Example 3, into an aqueous solution containing 30% by weight of sodium carbonate at 60° C., at a spinning velocity of 30 m./min. and with the draft of 1 and was passed through a hot water bath at a temperature between 55° C. and 60° C. and then was wound. The yarn obtained was dried in an air dryer at 110° C. The obtained elastic yarn had the following properties:

Tensile strength, 0.63 g./denier, elongation, 680%, Initial modulus, 0.03 g./denier, creep recovery, 96%.

Example 6

A polymer product was produced in the same manner as in Example 4 except that ε-caprolactone having end hydroxy groups and a molecular weight of 1,600 was employed. Dimethyl formamide solution of the polymer product in a concentration of 27% by weight was extruded in the same manner as in Example 4 to produce a yarn having the following properties:

Tensile strength, 0.72 g./denier; elongation, 730%, Initial modulus, 0.03 g./denier; creep recovery, 97%.

What we claim is:

1. A process for producing an elastic polyurethane yarn which comprises adding a solvent selected from the group consisting of dimethylformamide, dimethylacetamide, and dimethylsulfoxide to a prepolymer produced by reacting a diol polymer selected from the group consisting of polyethers, polyesters, polylactones and poly(oxyalkylene·carboxyalkylene), each of which has terminal hydroxyl groups, with an organic diisocyanate in an amount of 150 to 300 mole percent, based on the diol polymer, and with 3 to 30 moles of water per 100 moles of the diisocyanate to form a homogeneous solution, adding water to said solution at room temperature to bring said homogeneous solution to a gel state, heating the resulting gel at a temperature between 120° and 180° C. to obtain a solution state and then subjecting the solution to spinning.

2. A process according to claim 1, wherein the prepolymer is produced in the presence of a polymerization catalyst selected from the group consisting of dimethylcyclohexyl amine, triethylamine, triethylene diamine, iron acetoacetate, and dibtuyl-tin-dilaurate.

3. A process according to claim 1, wherein said diol prepolymer is selected from polymers having a molecular weight ranging from 400 to 10,000.

4. A process according to claim 1, wherein said diisocyanate is selected from the group consisting of 1,3-phenylene diisocyanate, 2,5-tolylene diisocyanate, 1,4-naphthalene diisocyanate, 1,5-naphthalene diisocyanate, 2,6-naphthalene diisocyanate, 4,4'-biphenyl diisocyanate, 3,3'-dimethyl-4,4'-biphenyl diisocyanate, 4,4'-diphenylmethane diisocyanate, and 2,2'-dimethyl-4,4'-diphenylmethane diisocyanate.

5. A process according to claim 1, wherein said solution is spun into a medium selected from the group consisting of air, water, aqueous ammonia, aqueous solution of inorganic salts and glycerine.

6. A process according to claim 2, wherein said diol prepolymer is selected from polymers having a molecular weight ranging from 400 to 10,000.

7. A process according to claim 2, wherein said diisocyanate is selected from the group consisting of 1,3-phenylene diisocyanate, 2,5-tolylene diisocyanate, 1,4-naphthalene diisocyanate, 1,5-naphthalene diisocyanate, 2,6-naphthalene diisocyanate, 4,4'-biphenyl diisocyanate, 3,3'-dimethyl-4,4'-biphenyl diisocyanate, 4,4'-diphenylmethane diisocyanate, and 2,2'-dimethyl-4,4'-diphenylmethane diisocyanate.

8. A process according to claim 2, wherein said solution is spun into a medium selected from the group consisting of air, water, aqueous ammonia, aqueous solutions of inorganic salts and glycerine.

References Cited by the Examiner

UNITED STATES PATENTS

| | | |
|---|---|---|
| 2,929,800 | 3/1960 | Hill. |
| 2,955,095 | 10/1960 | Gollob. |
| 3,137,671 | 6/1964 | Bosshard et al. |
| 3,142,652 | 7/1964 | Pace _____ 260—30.8 |

MORRIS LIEBMAN, *Primary Examiner.*

L. T. JACOBS, *Assistant Examiner.*